March 11, 1958  E. E. REED  2,826,211
MEANS FOR INJECTING A LIQUID ADDITIVE
INTO ANOTHER LIQUID Filed April 15, 1955  2 Sheets-Sheet 1

INVENTOR.
E. E. REED
BY Hudson & Young

ATTORNEYS

March 11, 1958

E. E. REED 2,826,211

MEANS FOR INJECTING A LIQUID ADDITIVE
INTO ANOTHER LIQUID

Filed April 15, 1955

2 Sheets-Sheet 2

INVENTOR.
E. E. REED

BY Hudson & Young

ATTORNEYS

United States Patent Office 2,826,211
Patented Mar. 11, 1958

2,826,211

MEANS FOR INJECTING A LIQUID ADDITIVE INTO ANOTHER LIQUID

Edwin E. Reed, Bartlesville, Okla., assignor to Phillips Petroleum Company, a corporation of Delaware Application April 15, 1955, Serial No. 501,607

15 Claims. (Cl. 137—98)

This invention relates to the dispensing of fluids, and concerns particularly apparatus for introducing an additive into a fluid being dispensed. The invention is especially adapted for introducing additives into gasoline and other liquid fuels, and will be discussed primarily as applied to that use.

The performance of an internal combustion engine can be improved considerably by the addition to its fuel of certain known additives, for example, carbon removing solvents and anti-icing agents. In a conventional means for mixing fluids of this type an additive pump is switched on to dispense one fluid into the other for the time required to attain the desired mixture, at which point the additive pump is turned off. See, for example, U. S. 2,530,682 and 2,638,247. While this is satisfactory for making up batches of the desired mixture, a problem arises when the additive must be added in rapid increments to a continuous stream of liquid. In this case the repeated and rapid switching on and off of the additive pump motor overheats it.

A major object of the present invention is to obviate the above difficulty by providing apparatus for injecting an additive at rapid intervals into a liquid fuel or other fluid as it is being dispensed, while accurately controlling the proportions of the mixture. A more specific object is to effect intermittent additive injection into gasoline flowing through a meter while continuously operating the additive injection pump.

In accordance with this invention a meter is installed in a gasoline stream controlling the frequency of opening and closing of a set of contacts in proportion to the flow rate through the meter. An additive pump runs continuously at constant speed but normally discharges through a bypass. The meter contacts actuate a 3-way solenoid valve which shuts off the bypass and opens the pump discharge to the main stream each time the contacts close. A time delay circuit allows flow of the additive for a predetermined period of time for each actuation. The additive is delivered into the fuel by means which assure a proper proportion of the additive to the fuel regardless of the flow rate of the latter.

Figure 1:
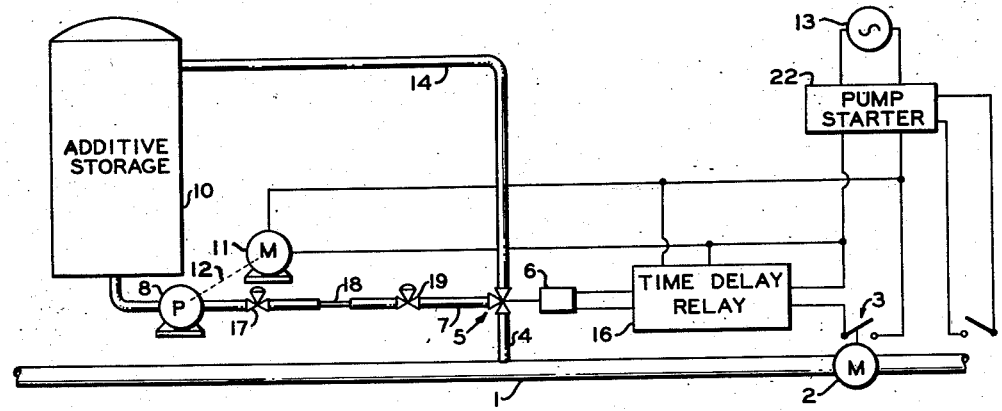
Figure 2:
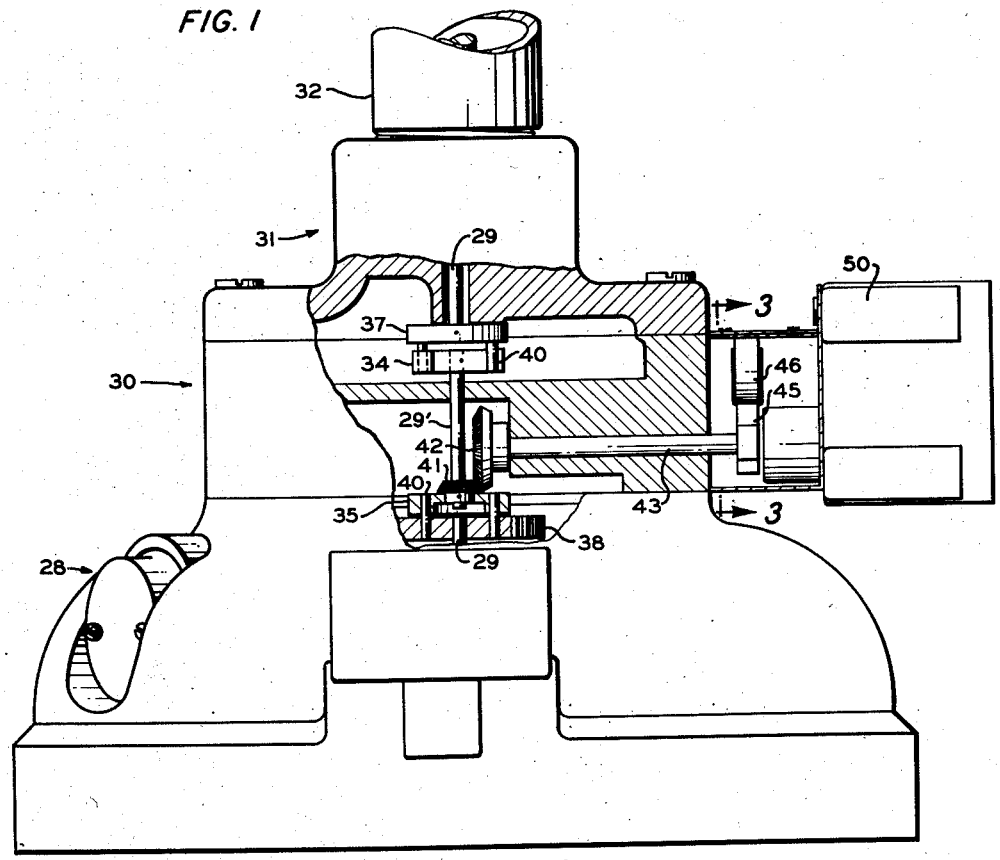
Figure 3:
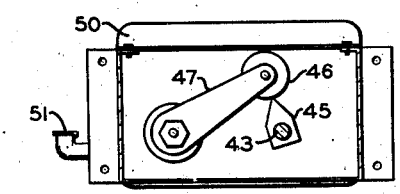
Figure 4:
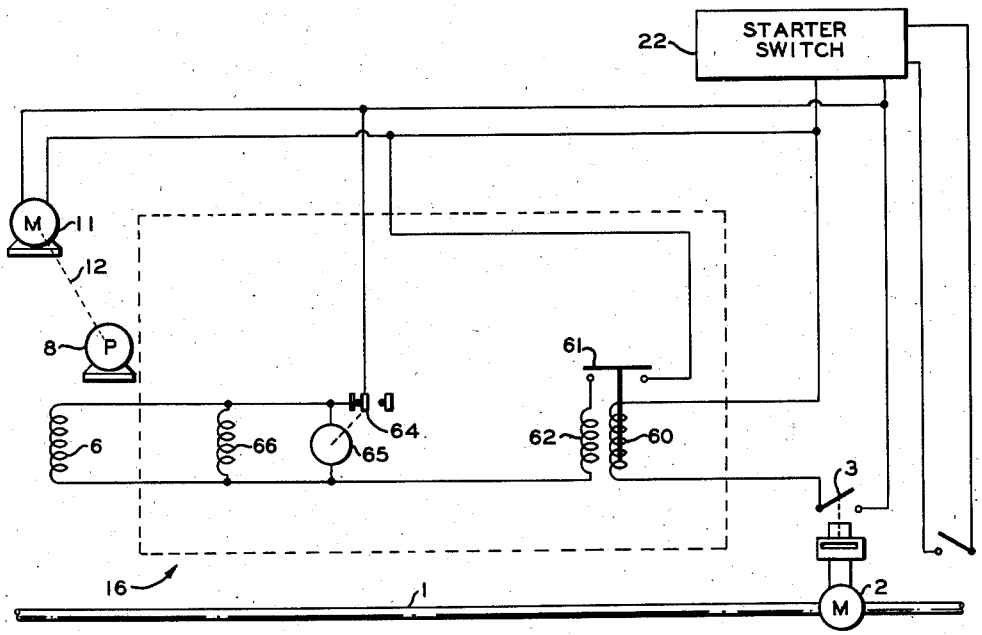
Figure 5:
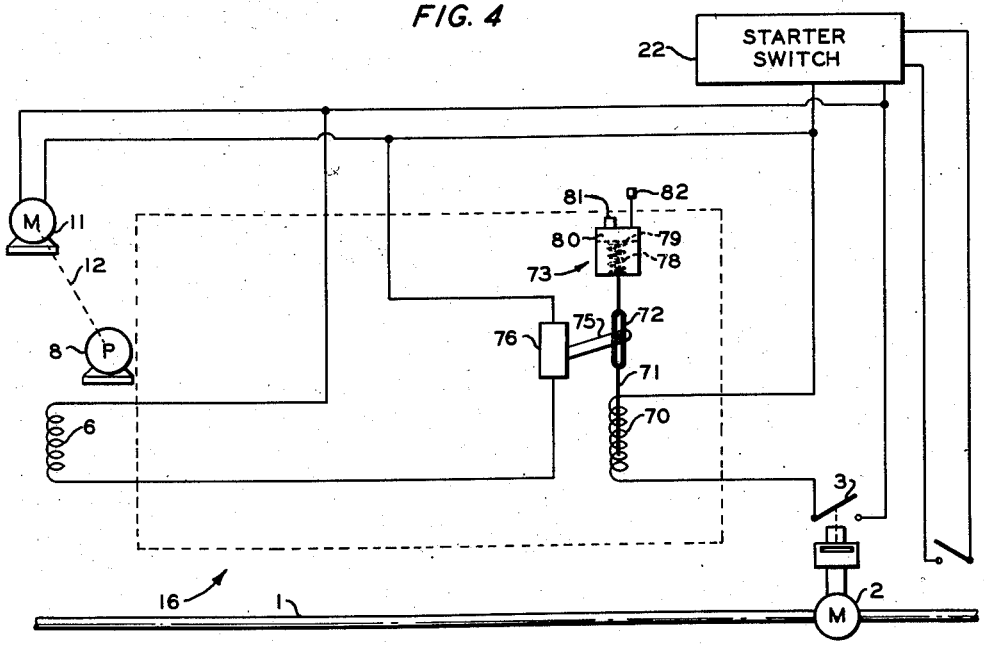

In the drawings Figure 1 illustrates schematically the entire combination of additive injection means and associated control mechanism. Figure 2 is a section view of the meter cap indicated only by a symbol in Figure 1. Figure 3 is a sectional view of the meter-actuated switch taken along line 3—3 of Figure 2. Figures 4 and 5 illustrate two alternative time delay mechanisms which could be used in the system.

Figure 1 illustrates schematically the operation of the invention. A stream of gasoline flows through line 1 and meter 2 from one container to another, for example, from a storage tank to a shipping dock. Meter 2 may be of any well known positive displacement type having a rotating shaft, the extent of rotation of which is directly proportional to the volume of fluid passed therethrough, and also having a switch-actuating cam mechanism described below in connection with Figures 2 and 3. A stream of additive is intermittently injected into line 1 through line 4 which connects to line 7 through a 2-position 3-way valve 5 actuated by solenoid 6. Line 7 is connected through pump 8 to a storage tank 10 or other source of supply. Pump 8 is operated by motor 11 through linkage 12, the motor being connected to a power supply 13. Solenoid valve 5 connects line 7 to bypass line 14, permitting the additive to flow from storage tank 10 through line 7, valve 5, and then through either bypass 14 or injection line 4, depending on the setting of valve 5. A pump starter 22 when turned on completes a circuit to the pump motor 11 and also completes the circuit to switch 3 and time delay relay 16. Switch 3 is momentarily closed each time the actuating cam connected with meter 2 makes a complete revolution. Switch 3 completes a circuit to time delay relay 16 which in turn completes a circuit to solenoid 6. Although switch 3 reopens, the circuit to solenoid 6 remains completed for a period of time determined by the setting of relay 16, thus controlling valve 5 to switch the flow from pipe 14 to pipe 4 for a predetermined period of time for each closure of switch 3.

To insure a constant rate of flow of additive through lines 7, 4, orifice 18 in line 7 is positioned between a pressure regulator 17 and another similar pressure regulator 19. Regulator 17 is set so as to apply a constant pressure against the upstream side of orifice 18 while regulator 19 maintains a constant pressure against its downstream side. This insures a constant pressure differential across orifice 18 and, hence, a uniform rate of additive flow therethrough.

Figure 2 illustrates details of the cam-actuating mechanism installed in the meter cap at the top of meter 2. This cap has been cut into two portions, a lower meter cap portion 28 and an upper cap portion or bonnet 31, each having a segment of rotatable shaft 29. Bonnet 31 connects to extension tube 32 and this to a conventional counter, not shown. Between these two sections of the meter cap a meter extension ring 30 is bolted. This unit comprises a section of shaft 29' having a disk 34 mounted at the upper end thereof and another disk 35 mounted at its lower end. Disks 34, 35 are coupled to disk 37 and gear 38, respectively, by means of coupling pins 40, thus permitting the three sections of shaft to be rotated as a unit by meter 2. When so rotated, the attached small bevel gear 41 rotates the engaged larger bevel gear 42 which rotates horizontal shaft 43 at a reduced speed. A small actuating cam 45 is attached to shaft 43 and rotates with it, thus engaging the roller 46 of switch arm 47 (Figure 3), and pivoting this arm sufficiently to actuate switch 50 at each rotation of the cam. Means for lubrication of switch 50 is provided by oil filler 51. Switch 50 is a snap-acting switch requiring little movement of the actuating means to open or close the contacts. An example of this type of switch is a "microswitch."

Figure 4 shows one type of suitable time delay relay 16. This includes a solenoid 60, switch 61, a holding coil 62, clock-actuated switch 64, clock motor 65, and clutch coil 66. When switch 3 is closed, a circuit is completed to solenoid winding 60, thus actuating switch 61 to complete a circuit through holding coil 62, the motor 65 of time switch 64, coil 66, and solenoid 6. Clock motor 65 starts to run and clutch coil 66 engages the mechanism which actuates switch 64 at the end of the desired time interval. An example of suitable means for mechanically linking coil 66 to switch 64 so as to govern the latter's operation is illustrated in U. S. 2,506,784. Although switch 3 opens, switch 61 remains closed due to the effect of holding coil 62 until time switch 64 opens. At this time solenoid 6 releases valve 5 to its normal position, switch 61 opens and time switch 64 is reset so that it is ready to be reactuated with the next closure of switch 3.

Figure 5 is a schematic drawing of another form of time delay relay 16. This comprises a coil 70, in the circuit of switch 3, a rod 71 having a slot 72 and connecting to a piston 80 in cylinder 73; it further includes a separate circuit connected in parallel with the other and containing switch 76 and solenoid 6, and a lever 75 for actuating switch 76. The closing of switch 3 energizes coil 70 which pulls down rod 71 until slot 72 engages lever 75 and pulls it down to close switch 76. This completes the circuit to solenoid 6, energizing it. As soon as switch 3 reopens, thus disconnecting coil 70, springs 78 starts piston 79 upward; the latter two elements together form a dash pot. Cylinder 73 is equipped with a check valve 81 which permits free inward flow of air to cylinder 73 but prevents outward flow therefrom. A needle valve 82 provides a variable small opening into cylinder 73. Thus, little restriction is offered to downward movement of piston 80 and attached rod 71; they can be moved rapidly to the downward position by solenoid 70. However, piston 80 moves slowly to the upper position and its rate of movement can be controlled by needle valve 82. Slot 72 is installed so that switch actuating lever 75 is tripped only at the extremes of travel of rod 71. The pin in the end of lever 75 engaging slot 72 has sufficient freedom of movement horizontally to prevent its binding in slot 72 at any point in its vertical range. Switch 76 completes the circuit to solenoid 6 of valve 5.

Assume that an additive such as anti-icing agent is to be added to a gasoline in the proportion of .0462% by volume and the maximum flow rate of gasoline through line 1 is 550 gallons/minute. By multiplying these two figures it is found that 0.255 gallon/minute of additive must be injected into the gasoline stream. If the flow of 10 gallons of gasoline gives one cam revolution and, hence, one pulse then there are 55 cam revolutions/minute; thence, the maximum time of injection per pulse $$=\frac{60}{55}=1.09 \text{ seconds}$$

A pump must now be selected to provide this capacity. To be on the safe side, a pump will be selected capable of making the necessary injection of additive in ¾ second rather than taking the full 1.09 seconds. Then, ¾ × 55 = 41.3 seconds of injection time per minute of gasoline flow. Hence, the required pump capacity is $$\frac{60}{41.3} \times .255 = 0.37 \text{ gallon/minute}$$

A satisfactory pump would be the Viking Model No. 654F which has a capacity of .433 gallon per minute. This particular pump would require 35.4 seconds injection time per minute of gasoline flow, or .645 second per pulse. Hence, the timer would be set to turn off in .645 second from the time it begins to run. The theoretical horsepower requirement for a motor operating this pump would be 0.38; so a ½ horsepower motor would probably be used.

The aforesaid specification should be considered as illustrative, not limiting, since other fluids could be mixed by the means of this invention; in addition, the construction and arrangement of parts may be modified within the spirit of the invention by those skilled in the art.

I claim:

1. Proportioning apparatus comprising a first conduit for the moving of liquid, a flow meter in said conduit having a contact-making device actuated thereby in response to the flow of liquid through said conduit, an additive injection line feeding into said conduit for the injection of an additive thereto, a 3-way valve in said injection line, a pump in said injection line positioned upstream from said valve, a bypass connected to said valve, said valve normally being open to said bypass so as to permit the pump to operate continuously although the injection line is opened only intermittently, a solenoid for adjusting said valve so as to close off said bypass and permit the flow of additive into said injection line, a time delay device governing said solenoid, a pair of electrical circuits connecting said time delay device and the contact-making device on said flow meter for alternately energizing and deenergizing said time delay device and associated solenoid to alternately turn said valve to the injector position and bypass position, a switch in one of said circuits operated intermittently by said contact-making device upon flow of a predetermined quantity of liquid through said meter, the closing of said switch energizing the valve-actuating solenoid to permit additive injection for a predetermined time irrespective of the reopening of the switch, the solenoid being deenergized at the expiration of this time by operation of the time delay device.

2. Apparatus of claim 1 wherein said injection line contains a restrictive orifice positioned between the pump and valve and a pair of pressure regulators, one on each side of the orifice, said regulators being synchronized so as to maintain a constant pressure differential across the orifice, thereby insuring a constant flow rate of additive.

3. A fluid mixing system comprising, in combination, a first conduit for the transporting of a liquid, an additive injection line connected to said first conduit to permit injection of additive into the latter, a solenoid-actuated 3-way valve in said line, a bypass connected to one orifice of said valve, the position of the valve determining whether additive enters the conduit or is bypassed, a solenoid for adjusting the position of said valve, said solenoid when actuated operating to adjust said valve to the additive injection position, a positive displacement flow meter in said first conduit having lever means actuated thereby in response to the liquid flow rate through the meter, and electrical means interconnecting said solenoid and lever means and including a circuit-breaking switch operative by said lever means to intermittently actuate said solenoid to adjust the valve setting to the injection position, and a time delay device for holding the solenoid in actuated state after the reopening of said switch and for a time sufficient to inject the required volume of additive into a specified volume of liquid in the first conduit.

4. In the apparatus of claim 3, a pump in the additive line upstream from the valve and driven by means independent of the aforesaid electrical means, whereby the pump is capable of operating continuously regardless of the position of the valve.

5. A liquid fuel dispensing unit comprising a conduit for the transportation of a liquid; a positive displacement flow meter in said conduit having a pinion rotated by the flow of liquid through the meter, an additive container, a line connecting said container to said conduit to permit injection of additive into the latter, a 3-way valve in said line, a bypass connected with said valve and to said container, whereby the valve in its normal position permits additive to be recirculated through said bypass for return to said container, and in its other position permitting additive flow into said conduit, a control system including a solenoid for turning said valve from its normal position to its other position, a circuit-breaking switch adapted to be operated intermittently from the pinion on said flow meter upon flow of a predetermined quantity of liquid, thereby initiating operation of said control system and setting the valve in its additive position, and a second switch for deenergizing said control system upon addition of a predetermined quantity of additive irrespective of the position of the first switch.

6. Apparatus of claim 5 wherein the flow meter comprises a shaft which is rotated by the fluid flow through the meter, a pinion on said shaft, a second shaft geared to the pinion, and a cam mounted on the second shaft for rotation therewith and operable to actuate the circuit-breaking switch, the cam operating to hold the switch closed for a portion of each cam revolution and to hold it open during the remainder of the revolution.

7. Apparatus of claim 5 wherein the control system comprises two separate electrical circuits and a time delay device, the first circuit containing the aforesaid cam-operated switch and means to energize the second circuit, the second circuit containing the aforesaid solenoid for controlling the position of the 3-way valve, and the time delay device serving to keep the second circuit closed for a predetermined period of time irrespective of subsequent reopening of the cam-operated switch and the resultant breaking of the first circuit, said period of time being that necessary to permit diversion of a specific amount of additive through the 3-way valve and injection line into the conduit.

8. In a gasoline additive system, a conduit for the movement of gasoline from one point to another, an additive injection line connected to said conduit, a solenoid operated 3-way valve in said injection line provided with a bypass, a first and second electrical circuit, each containing a switch to open and close the circuit and a solenoid, the first circuit controlling through its solenoid the switch which energizes the second circuit, and the second circuit controlling through its solenoid the position of the aforesaid 3-way valve, a positive displacement flow meter in said gasoline conduit having means for alternately opening and closing the switch in the first circuit with a frequency which is governed by the flow through the meter, whereby the aforesaid electrical circuits are completed and the solenoid actuated to permit additive injection at intervals based on the flow of a predetermined volume of gasoline through the meter, and a time delay means associated with the second circuit to keep this circuit temporarily closed and its solenoid actuated regardless of the reopening of the other circuit, thereby permitting the valve to dispense additive into the gasoline conduit for a time sufficient to effect the proper ratio of additive to gasoline.

9. Apparatus of claim 8 wherein the time delay means comprises a rod held at one end by the solenoid of the first circuit when the latter is energized, a piston attached to the other end of the rod, a cylinder within which the piston reciprocates, a compressed spring urging the piston and connecting rod forward and away from the solenoid, a valve arrangement in the cylinder head which retards escape of air therefrom when the piston moves forward but permits prompt introduction of air when the piston moves backward, and a direct mechanical linkage between the rod and the switch in the second circuit, the switch being quickly closed when the energized solenoid in the first circuit pulls the rod toward the solenoid in opposition to the spring, and the switch being slowly opened when the de-energized solenoid releases the rod, permitting the piston to be pushed forward by the spring until the attached mechanical linkage turns off the switch.

10. Apparatus of claim 8 wherein the time delay means comprises a time switch in the second circuit, said switch being designed to break the circuit at the expiration of any desired period, and means including a clutch coil in the second circuit for activating the time switch when the second circuit is energized by the first circuit, said switch serving to keep the second circuit closed for a predetermined time regardless of the reopening of the first circuit.

11. In a mechanism comprising a liquid transfer conduit, a flow meter in said conduit for measuring the fluid flow therethrough, a container for storing an additive to be admitted to said conduit, means providing for the continuous circulation of additive from said container back to said container, and an additive injector associated with said circulation means to permit diversion of additive into said conduit, in combination with said mechanism, means providing for control of said additive injector in response to the metering action of said flow meter, said control means including an electrical circuit, a switch in said circuit adapted to be temporarily closed by the action of said flow meter upon flow of a predetermined volume of liquid through said conduit, the closure of said circuit effecting operation of said additive injector, and means permitting continued operation of said injector for a timed period after the reopening of said switch including a timing device connected in parallel with the circuit containing said switch and actuated by the closure of said circuit for a predetermined period of operation, said timing device serving to continue additive injection until the end of said timed interval and independently of said flow meter.

12. A fluid proportioning mechanism comprising, in combination, a main conduit for fluid transfer, a storage vessel containing an additive fluid to be added proportionately to the fluid passing through the main conduit, a circulating line defining an endless loop with said storage vessel, a pump having its inlet and outlet connected in said line, valve means in said line connected to said main conduit, said valve means being constructed and arranged normally to permit circulation of additive fluid through said loop and when actuated to divert additive fluid from said loop and inject it into said main conduit, and means for effecting intermittent actuation of said valve means, the frequency of said intermittent actuation being proportional to the rate of flow of fluid through said main conduit.

13. A fluid proportioning mechanism comprising, in combination, a main conduit for fluid transfer, a flow meter in said main conduit for measuring fluid flow therethrough, a storage vessel containing an additive fluid to be added proportionately to the fluid passing through the main conduit, a circulating line defining an endless loop with said storage vessel, a pump having its inlet and outlet connected in said line, means for continuously operating said pump, valve means in said line downstream from said pump and connected to said main conduit, said valve means being constructed and arranged normally to permit circulation of additive fluid through said loop and when actuated to divert additive fluid from said loop and inject it into said main conduit, means for producing an output in response to a predetermined flow of fluid through said flow meter, and means for effecting intermittent actuation of said valve means for a measured period of time in response to said output.

14. In a mechanism comprising a liquid transfer conduit, a flow meter in said conduit for measuring the fluid flow therethrough, a container for storing an additive to be admitted to said conduit, means providing for the continuous circulation of additive from said container back to said container, and an additive injector associated with said circulation means to permit diversion of additive into said conduit, said additive injector including a 3-way valve integral with said circulation means and positioned to permit either the aforesaid circulation of additive or its diversion to said liquid transfer conduit, a pipe connecting one outlet of said valve to said conduit, the direction of flow being determined by the position of said valve, and a solenoid regulating the setting of said valve so as to govern the frequency and duration of additive flow through said conduit, in combination with said mechanism, means providing for control of said additive injector in response to the metering action of said flow meter, said control means including an electrical circuit, a switch in said circuit adapted to be temporarily closed by the action of said flow meter upon flow of a predetermined volume of liquid through said conduit, the closure of said circuit effecting operation of said additive injector, and means permitting continued operation of said injector for a timed period after the reopening of said switch.

15. In a mechanism comprising a liquid transfer conduit, a flow meter in said conduit for measuring the fluid flow therethrough, a container for storing an additive to be admitted to said conduit, means providing for the continuous circulation of additive from said container back to said container, and an additive injector associated with said circulation means to permit diversion of additive into said conduit, in combination with said mechanism, means providing for control of said additive injector in response to the metering action of said flow meter, said control means including an electrical circuit, a switch in said circuit adapted to be temporarily closed by the action of said flow meter upon flow of a predetermined volume of liquid through said conduit, the closure of said circuit effecting operation of said additive injector, and means permitting continued operation of said injector for a timed period after the reopening of said switch, said flow meter being of the positive displacement type and including a rotatable shaft, the rotation of which is proportioned to the flow of liquid through the flow meter, and a rotatable cam driven from said shaft and in contact with the switch in the control circuit so as to alternately open and close the latter, whereby the frequency of opening and closing said switch is directly proportional to the flow rate through the meter.

References Cited in the file of this patent
UNITED STATES PATENTS

| | | |
|---|---|---|
| 2,252,939 | McCoy | Aug. 19, 1941 |
| 2,707,480 | Klosse | May 3, 1951 |